United States Patent
Fingland et al.

(10) Patent No.: US 11,788,019 B2
(45) Date of Patent: Oct. 17, 2023

(54) HIGH PRESSURE HYDROFINISHING FOR LUBRICANT BASE OIL PRODUCTION

(71) Applicant: ExxonMobil Technology and Engineering Company, Annandale, NJ (US)

(72) Inventors: Bradley R. Fingland, Mason, MI (US); Gary P. Schleicher, Milford, NJ (US)

(73) Assignee: Exxon Mobil Technology and Engineering Company, Annandale, NJ (US)

(*) Notice: Subject to any disclaimer, the term of this patent is extended or adjusted under 35 U.S.C. 154(b) by 456 days.

(21) Appl. No.: 16/742,208

(22) Filed: Jan. 14, 2020

(65) Prior Publication Data
US 2020/0148962 A1    May 14, 2020

Related U.S. Application Data

(62) Division of application No. 15/453,227, filed on Mar. 8, 2017, now Pat. No. 10,584,291.
(Continued)

(51) Int. Cl.
*C10G 69/02* (2006.01)
*C10G 45/04* (2006.01)
(Continued)

(52) U.S. Cl.
CPC .......... *C10G 69/02* (2013.01); *B01J 29/043* (2013.01); *C10G 45/04* (2013.01); *C10G 45/08* (2013.01);
(Continued)

(58) Field of Classification Search
CPC ........ C10M 171/02; C10M 2203/1025; C10M 101/02
See application file for complete search history.

(56) References Cited

U.S. PATENT DOCUMENTS

| | | | |
|---|---|---|---|
| 5,468,368 | A | 11/1995 | Baker, Jr. et al. |
| 6,517,704 | B1 | 2/2003 | Carroll et al. |

(Continued)

FOREIGN PATENT DOCUMENTS

| | | |
|---|---|---|
| CA | 2926149 A1 | 7/2015 |
| WO | 2012/006044 A1 | 1/2012 |
| WO | 2012/142220 A1 | 10/2012 |

OTHER PUBLICATIONS

The International Search Report and Written Opinion of PCT/US2017/021332 dated May 15, 2017.
(Continued)

*Primary Examiner* — James C Goloboy
(74) *Attorney, Agent, or Firm* — C. Tumey Law Group PLLC

(57) ABSTRACT

Systems and methods are provided for catalytic hydroprocessing to form lubricant base oils. The methods can include performing high pressure hydrofinishing after fractionating the hydrotreated and/or hydrocracked and/or dewaxed effluent. Performing hydrofinishing after fractionation can allow the high hydrogen pressure for hydrofinishing to be used on one or more lubricant base oil fractions that are desirable for high pressure hydrofinishing. This can allow for improved aromatic saturation of a lubricant base oil product while reducing or minimizing the hydrogen consumption. The high pressure hydrofinishing can be performed at a hydrogen partial pressure of at least about 2500 psig (~17.2 Mpa), or at least about 2600 psig (~18.0 Mpa), or at least about 3000 psig (~20.6 MPa). The high pressure hydrofinishing can allow for formation of a lubricant base oil product with a reduced or minimized aromatics content, a reduced or minimized 3-ring aromatics content, or a combination thereof.

16 Claims, 2 Drawing Sheets

Related U.S. Application Data

(60) Provisional application No. 62/315,780, filed on Mar. 31, 2016.

(51) Int. Cl.

| | | |
|---|---|---|
| *C10M 101/02* | (2006.01) | |
| *C10G 65/12* | (2006.01) | |
| *C10G 45/46* | (2006.01) | |
| *C10G 45/08* | (2006.01) | |
| *C10G 47/02* | (2006.01) | |
| *B01J 29/04* | (2006.01) | |
| *C10M 171/02* | (2006.01) | |
| *C10N 20/02* | (2006.01) | |

(52) U.S. Cl.
CPC ............. *C10G 45/46* (2013.01); *C10G 47/02* (2013.01); *C10G 65/12* (2013.01); *C10M 101/02* (2013.01); *C10M 171/02* (2013.01); *C10G 2300/1048* (2013.01); *C10G 2300/302* (2013.01); *C10G 2300/4012* (2013.01); *C10G 2400/10* (2013.01); *C10M 2203/1025* (2013.01); *C10N 2020/02* (2013.01)

(56) References Cited

U.S. PATENT DOCUMENTS

| | | |
|---|---|---|
| 7,347,928 B2 | 3/2008 | Van Beijnum et al. |
| 8,298,403 B2 | 10/2012 | Elia et al. |
| 8,366,908 B2 | 2/2013 | Prentice et al. |
| 2004/0245147 A1 | 12/2004 | Boucher Ashe |
| 2007/0238628 A1* | 10/2007 | Haire .................. C10M 177/00 508/591 |
| 2009/0001330 A1* | 1/2009 | Arickx ................ C10M 171/00 252/570 |
| 2010/0187156 A1 | 7/2010 | Prentice et al. |
| 2011/0315599 A1 | 12/2011 | Prentice et al. |
| 2012/0261307 A1 | 10/2012 | Joseck et al. |
| 2013/0158314 A1 | 6/2013 | Schleicher et al. |
| 2013/0341243 A1 | 12/2013 | Novak et al. |
| 2015/0275106 A1 | 10/2015 | Vaughn et al. |

OTHER PUBLICATIONS

Beck, J.S. et al., "A New Family of Mesoporous Molecular Sieves Prepared with Liquid Crystal Templates", Journal of the American Chemical Society, 1992, vol. 114, pp. 10834-10843.

* cited by examiner

HIGH PRESSURE HYDROFINISHING FOR LUBRICANT BASE OIL PRODUCTION

CROSS-REFERENCE TO RELATED APPLICATIONS

This application is a divisional application filed under 37 C.F.R. 1.53(b) of parent U.S. patent application Ser. No. 15/453,227, the entire contents of which are incorporated herein by reference, and claims the benefit of U.S. Nonprovisional patent application Ser. No. 15/453,227 filed on Mar. 8, 2017, which claims priority to U.S. Provisional Application Ser. No. 62/315,780 filed Mar. 31, 2016, which is herein incorporated by reference in its entirety.

FIELD

Systems and methods are provided for production of lubricant base oils with reduced aromatics content.

BACKGROUND

Catalytic hydroprocessing is commonly used to form lubricant base oils from suitable feeds. The hydroprocessing can typically include one or more of hydrotreatment for removal of heteroatoms, hydrocracking for improvement of viscosity index, catalytic dewaxing for improvement of cold flow properties, and hydrofinishing to reduce or minimize the amount of aromatics. While a broad range of processing conditions can potentially be used for each type of hydroprocessing, in practice the conditions between hydroprocessing steps used on a single feed can typically be related in order to allow for efficient use of refinery resources.

U.S. Patent Application Publication 2012/0261307 describes an integrated process for, hydrotreating, hydrocracking and dewaxing of a feed to form fuels and lubricant products. The integrated process includes use of three hydroprocessing stages, with a high pressure stripping/separating zone between the first and second stage. The high pressure and temperature stripping/separating zone operates with no disengagement between or following the hydroprocessing zones. This can allow the process pressure to be greatest at the entrance to the first hydroprocessing zone.

U.S. Patent Application Publication 2013/0341243 describes a hydrocracking process selective for improved distillate and improved lube yield and properties. A two-stage hydrocracking catalyst can be used for hydrocracking of a feed to form a converted portion suitable for diesel fuel production and an unconverted portion suitable for production of lubricant base oils. The two-stage hydrocracking catalyst can correspond to a first stage catalyst including Pd and/or Pt supported on USY and a second stage catalyst including Pd and/or Pt supported on ZSM-48.

U.S. Patent Application Publication 2013/0158314 describes a multi-stage aromatic saturation process. Although higher pressures are described for hydrotreatment and hydrocracking of a feedstock, the highest hydrogen partial pressure described for an aromatic saturation process is 1000 psia (6.9 MPa) or less.

SUMMARY

In an aspect, a method for forming a lubricant base stock, is provided. The method can include hydrocracking a lubricant boiling range feed under hydrocracking conditions. The hydrocracking conditions can optionally include a pressure of 2000 psig (13.8 MPa) or less, or 1500 psig (10.3 MPa) or less. At least a portion of a lubricant boiling range feed can also be dewaxed under dewaxing conditions to form a hydroprocessed effluent. The dewaxing can occur prior to the hydrocracking, during the hydrocracking, and/or after the hydrocracking. The hydroprocessed effluent can be fractionated to form one or more hydroprocessed lubricant boiling range fractions. At least one hydroprocessed lubricant boiling range fraction can be hydrofinished under hydrofinishing conditions to form at least one hydrofinished product. Optionally, the hydrogen partial pressure of the hydrofinishing conditions can be greater than a hydrogen partial pressure of the dewaxing conditions, such as at least 250 psig greater (1.7 MPa), or at least 500 psi greater (3.5 MPa) or more. Optionally, the hydrofinishing conditions can include a hydrogen partial pressure of greater than 2000 psig (13.8 MPa), with the hydrogen partial pressure of the hydrofinishing conditions being greater than the hydrogen partial pressure of the dewaxing conditions.

In another aspect, a hydrofinished lubricant boiling range composition is provided. The composition can optionally have a kinematic viscosity at 100° C. of at least 2 cSt, such as 2 cSt to 4 cSt, or 4 cSt to 8 cSt, or 8 cSt to 16 cSt, or 16 cSt to 32 cSt. The composition can further optionally have a viscosity index of at least 80, or at least 120. The composition can further optionally have a total aromatics content of 0.4 wt % or less. The composition can further optionally have a 3-ring aromatics content of 0.035 wt % or less.

DETAILED DESCRIPTION

Overview

Figure 1:
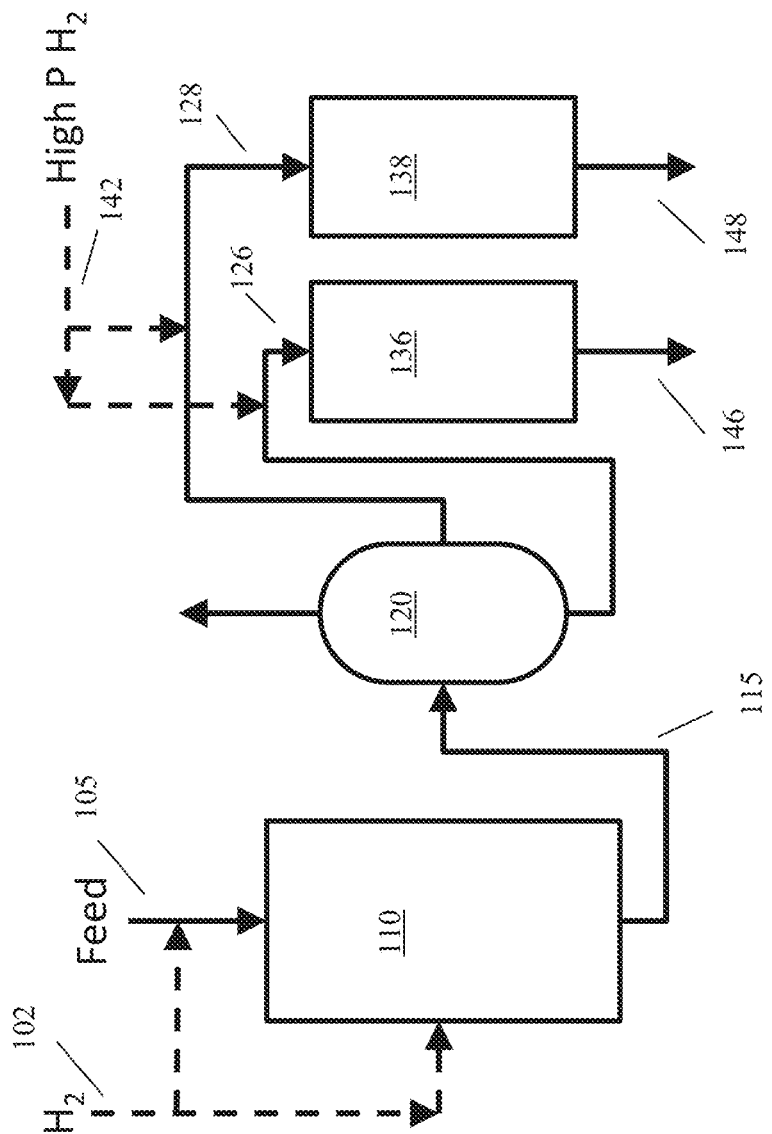
FIG. 1 schematically shows an example of a configuration for performing high pressure hydrofinishing.

All numerical values within the detailed description and the claims herein are modified by "about" or "approximately" the indicated value, and take into account experimental error and variations that would be expected by a person having ordinary skill in the art.

In various aspects, systems and methods are provided for catalytic hydroprocessing to form lubricant base oils. The methods can include performing high pressure hydrofinishing after fractionating the hydrotreated and/or hydrocracked and/or dewaxed effluent. Performing hydrofinishing after fractionation can allow the high hydrogen pressure for hydrofinishing to be used only on one or more lubricant base oil fractions that are desirable for high pressure hydrofinishing. This can allow for improved aromatic saturation of a lubricant base oil product while reducing or minimizing the hydrogen consumption. The high pressure hydrofinishing can be performed at a hydrogen partial pressure of greater than 2000 psig (~13.8 MPa), or greater than 2500 psig (~17.2 Mpa), or greater than 2600 psig (~18.0 Mpa), or greater than 3000 psig (~20.6 MPa), or at least 3200 psig (22.1 MPa), or at least 3500 psig (24.1 MPa). The high pressure hydrofinishing can allow for formation of a lubricant base oil product with an aromatics content of 2.0 wt % or less, or 1.5 wt % or less, or 1.0 wt % or less, or 0.5 wt % or less, or 0.4 wt % or less, or 0.3 wt % or less, or 0.2 wt % or less, or 0.1 wt % or less. Additionally or alternately, the 3-ring aromatics content of the hydrofinished effluent can be 0.050 wt % or less, or 0.040 wt % or less, or 0.035 wt % or less, or 0.030 wt % or less, or 0.025 wt % or less, or 0.020 wt % or less, or 0.015 wt % or less, or 0.010 wt % or less. Because the high pressure hydrofinishing is performed on a fractionated portion of the effluent from prior hydroprocessing, the reactor(s) for the high pressure hydrofinishing can also have a reduced or minimized refinery footprint. Optionally, fractionation prior to high pressure hydrofinishing can allow for exposing at least one lubricant base oil product to high pressure hydrofinishing conditions while allowing at least a second lubricant base oil product to be exposed to lower pressure hydrofinishing conditions and/or not exposed to any additional hydrofinishing after fractionation.

Conventionally, many types of processes for lubricant base oil production operate at total pressures of about 2000 psig (~13.8 MPa) or less, or 1500 psig (~10.3 MPa) or less. This can be due in part to the large hydrogen demand that can result from operating hydrotreating and/or hydrocracking processes at elevated hydrogen partial pressures. In order to reduce costs for delivery of make-up hydrogen to the lubricant production process, a common hydrogen compressor is often used. Thus, all of the hydroprocessing steps during lubricant production can conventionally be performed at similar hydrogen partial pressures and/or at pressures that are related to each other within the hydroprocessing flow. A hydrofinishing type catalyst is often incorporated into the process flow for lubricant base oil production after the final hydrocracking and/or dewaxing stage, in order to reduce the aromatics content of the resulting hydroprocessed effluent. After forming a hydroprocessed effluent, the effluent can then be fractionated to form one or more lubricant base oil fractions or products.

In contrast to conventional methods, one or more separate hydrofinishing reactors can be used to hydrofinish a hydroprocessed effluent after fractionation of the effluent to form one or more lubricant base oil fractions, such as a plurality of lubricant base oil fractions. The one or more separate hydrofinishing reactors can have a separate compressor for providing make-up hydrogen. In aspects where only a portion of the hydroprocessed effluent is exposed to high pressure hydrofinishing, this can reduce or minimize the size of the reactor(s) and/or the compressor for performing high pressure hydrofinishing. The size of the compressor can be further reduced based on the low hydrogen consumption during a typical hydrofinishing process that is performed on a hydroprocessed effluent for lubricant base oil production.

In this discussion, the naphtha boiling range is defined as about 50° F. (~10° C., roughly corresponding to the lowest boiling point of a pentane isomer) to 350° F. (177° C.). The jet boiling range is defined as 284° F. (140° C.) to 572° F. (300° C.). The diesel boiling range is defined as 350° F. (177° C.) to 650° F. (343° C.). The lubricant boiling range is defined as 650° F. (343° C.) to 1050° F. (566° C.). Compounds ($C_{4-}$) with a boiling point below the naphtha boiling range can be referred to as light ends.

Hydroprocessing is used herein to denote various processes involving treatment of a feed in the presence of hydrogen and include processes which involve at least one of boiling range reduction, removal of contaminants, viscosity reduction, viscosity index (VI) increase, pour point reduction and aromatics saturation. Examples of typical hydroprocessing schemes include hydrotreating, hydrocracking, hydrofinishing (a.k.a, hydrofining), hydrodewaxing, hydroisomerization, and raffinate hydroconversion.

Group I basestocks or base oils are defined as base oils with less than 90 wt % saturated molecules and/or at least 0.03 wt % sulfur content. Group I basestocks also have a viscosity index (VI) of at least 80 but less than 120. Group II basestocks or base oils contain at least 90 wt % saturated molecules and less than 0.03 wt % sulfur. Group II basestocks also have a viscosity index of at least 80 but less than 120. Group III basestocks or base oils contain at least 90 wt % saturated molecules and less than 0.03 wt % sulfur, with a viscosity index of at least 120. In addition to the above formal definitions, some Group I basestocks may be referred to as a Group I+ basestock, which corresponds to a Group I basestock with a VI value of 103 to 108. Some Group II basestocks may be referred to as a Group II+ basestock, which corresponds to a Group II basestock with a VI of at least 113. Some Group III basestocks may be referred to as a Group III+ basestock, which corresponds to a Group III basestock with a VI value of at least 140.

Feedstocks

A wide range of petroleum and chemical feedstocks can be hydroprocessed in accordance with the disclosure. Suitable feedstocks include whole and reduced petroleum crudes, atmospheric, cycle oils, gas oils, including vacuum gas oils and coker gas oils, light to heavy distillates including raw virgin distillates, hydrocrackates, hydrotreated oils, slack waxes, Fischer-Tropsch waxes, raffinates, and mixtures of these materials.

One way of defining a feedstock is based on the boiling range of the feed. One option for defining a boiling range is to use an initial boiling point for a feed and/or a final boiling point for a feed. Another option is to characterize a feed based on the amount of the feed that boils at one or more temperatures. For example, a "T5" boiling point for a feed is defined as the temperature at which 5 wt % of the feed will boil off. Similarly, a "T95" boiling point is a temperature at 95 wt % of the feed will boil. Boiling points, including fractional weight boiling points, can be determined using a suitable ASTM method, such as ASTM D2887.

Typical feeds include, for example, feeds with an initial boiling point and/or a T5 boiling point of at least 600° F. (~316° C.), or at least 650° F. (~343° C.), or at least 700° F. (371° C.), or at least 750° F. (~399° C.). Additionally or alternately, the final boiling point and/or T95 boiling point of the feed can be 1100° F. (~593° C.) or less, or about 1050° F. (~566° C.) or less, or about 1000° F. (~538° C.) or less, or about 950° F. (~510° C.) or less. Optionally, if the hydroprocessing is also used to form fuels, it can be possible to use a feed that includes a lower boiling range portion. Such a feed can have an initial boiling point and/or a T5 boiling point of at least about 350° F. (~177° C.), or at least about 400° F. (~204° C.), or at least about 450° F. (~232° C.).

In aspects where the hydroprocessing includes a hydrotreatment process and/or a sour hydrocracking process, the feed can have a sulfur content of about 500 wppm to about 20000 wppm or more, or about 500 wppm to about 10000 wppm, or about 500 wppm to about 5000 wppm. Additionally or alternately, the nitrogen content of such a feed can be about 50 wppm to about 4000 wppm, or about 50 wppm to about 2000 wppm. In some aspects, the feed can correspond to a "sweet" feed, so that the sulfur content of the feed is about 10 wppm to about 500 wppm and/or the nitrogen content is about 1 wppm to about 100 wppm.

In some embodiments, at least a portion of the feed can correspond to a feed derived from a biocomponent source. In this discussion, a biocomponent feedstock refers to a hydrocarbon feedstock derived from a biological raw material component, from biocomponent sources such as vegetable, animal, fish, and/or algae. Note that, for the purposes of this document, vegetable fats/oils refer generally to any plant based material, and can include fat/oils derived from a source such as plants of the genus Jatropha. Generally, the biocomponent sources can include vegetable fats/oils, animal fats/oils, fish oils, pyrolysis oils, and algae lipids/oils, as well as components of such materials, and in some embodiments can specifically include one or more type of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

After hydroprocessing, one or more of the lubricant boiling range fractions of the hydroprocessed effluent can have an aromatics content of 1.5 wt % to 10.0 wt %, or 2.0 wt % to 10.0 wt %, or 4.0 wt % to 10.0 wt %, or 1.5 wt % to 8.0 wt %, or 2.0 wt % to 8.0 wt %, or 4.0 wt % to 8.0 wt %, as determined by UV/VIS spectroscopy.

Additionally or alternately, after hydroprocessing, one or more of the lubricant boiling range fractions of the hydroprocessed effluent can have a 3-ring aromatics content of 0.1 wt % or greater, such as 0.1 wt % to 2.0 wt %, or 0.1 wt % to 1.0 wt %, or 0.1 wt % to 0.5 wt %, or 0.2 wt % to 2.0 wt %, or 0.2 wt % to 1.0 wt %, or 0.2 wt % to 0.5 wt %, or 0.4 wt % to 2.0 wt %, or 0.4 wt % to 1.0 wt %.

The aromatics content in a lubricant base stock can be determined by any convenient method. Commonly used methods include ASTM D2007, ASTM D7419, and IP 368. One option for determining the aromatics content of the lubricant base stock product can be to determine the aromatics content according to ASTM D2008. ASTM D2008 provides one example of a method for correlating data generated from UV/VIS spectroscopy with a weight of aromatics present in a sample. Alternatively, other methods for correlating data from UV/VIS spectroscopy with a weight of aromatics in a sample can also be used.

High Pressure Hydrofinishing on Lubricant Boiling Range Fractions

In various aspects, a hydroprocessed effluent can be fractionated to form one or more lubricant boiling range fractions. The fractionation can optionally also form one or more diesel boiling range fractions, one or more naphtha boiling range fractions, and a light ends fraction. The additional fuels boiling range fractions can be present due to incorporation of lower boiling compounds in the feed for hydroprocessing and/or due to conversion of the feed during hydroprocessing.

The fractionation of the hydroprocessed effluent can result in formation of one or more lubricant boiling range fractions, such as a plurality of lubricant boiling range fractions. The one or more lubricant boiling range fractions can have a desired viscosity depending on the nature of the hydroprocessed effluent. The desired viscosity can typically be a kinematic viscosity at 100° C. of at least 2 cSt, or at least 4 cSt, or at least 6 cSt. For example, the fractionation can result in formation of one or more light lubricant base oil fractions having a kinematic viscosity at 100° C. of 2 cSt to 4 cSt; one or more medium lubricant base oil fractions having a kinematic viscosity at 100° C. of 4 cSt to 8 cSt; one or more heavy lubricant base oil fractions having a kinematic viscosity at 100° C. of 8 cSt to 16 cSt; and/or one or more bright stock fractions having a kinematic viscosity at 100° C. of 16 cSt to 32 cSt or more. Optionally, the lubricant boiling range fractions (prior to high pressure hydrofinishing) can have an aromatics content of 1.5 wt % to 10.0 wt %, or or 2.0 wt % to 10.0 wt %, or 4.0 wt % to 10.0 wt %, or 1.5 wt % to 8.0 wt %, or 2.0 wt % to 8.0 wt %, or 4.0 wt % to 8.0 wt %, as determined by UV/VIS spectroscopy.

Optionally, the lubricant boiling range fractions (prior to high pressure hydrofinishing) can have a 3-ring aromatics content of 0.1 wt % to 2.0 wt %, or 0.1 wt % to 1.0 wt %, or 0.1 wt % to 0.5 wt %, or 0.2 wt % to 2.0 wt %, or 0.2 wt % to 1.0 wt %, or 0.2 wt % to 0.5 wt %, or 0.4 wt % to 2.0 wt %, or 0.4 wt % to 1.0 wt %. It is noted that the aromatics content can differ between different fractions. For example, higher viscosity fractions may have a higher aromatics content than lower viscosity fractions, so that it may be desirable to expose only selected fractions to high pressure hydrofinishing.

After fractionation, one or more lubricant boiling range fractions formed during fractionation can be exposed to high pressure hydrofinishing conditions. In some aspects, a plurality of lubricant boiling range fractions can be formed, and at least one fraction can be exposed to high pressure hydrofinishing while at least one different fraction can be exposed to hydrofinishing at lower pressure and/or not exposed to further hydrofinishing and/or other hydroprocessing.

Any convenient type of hydrofinishing catalyst can be used for high pressure hydrofinishing. One option for a hydrofinishing catalyst is a catalyst that includes Pt, Pd, or a combination thereof on a non-acidic support such as alumina or titania. This includes conventional hydrotreating catalysts with Pt or Pd supported on alumina. The catalyst can include from 0.1 wt % to 5.0 wt % of hydrogenation metal relative to the weight of the support. Due to the low acidity support, this type of catalyst causes little or no cracking of feed while being effective for reduction of single ring aromatics. However, this type of catalyst tends to deactivate rapidly, resulting in frequent reactor shut down operations to allow for catalyst skimming and/or change out.

Another suitable type of hydrofinishing catalyst can be a catalyst based on the M41S family of catalyst supports, such as MCM-41, MCM-48, or MCM-50. In some aspects, an aromatic saturation (hydrofinishing) catalyst can comprise, consist essentially of, or be a Group VIII and/or Group VIB metal on a support material, e.g., an amorphous support such as a bound support from the M41S family, for instance bound MCM-41. The M41S family of catalysts can be described as mesoporous materials having relatively high silica contents, e.g., whose preparation is further described in *J. Amer. Chem. Soc.*, 1992, 114, 10834. Examples of M41S materials can include, but are not limited to MCM-41, MCM-48, MCM-50, and combinations thereof. Mesoporous is understood to refer to catalysts having pore sizes from 15 Angstroms to 100 Angstroms. A preferred member of this class is MCM-41, whose preparation is described, e.g., in U.S. Pat. No. 5,098,684. MCM-41 is an inorganic, porous, non-layered phase having a hexagonal arrangement of uniformly-sized pores. The physical structure of MCM-41 is similar to a bundle of straws, in which the opening of the straws (the cell diameter of the pores) ranges from 15-100 Angstroms. MCM-48 has a cubic symmetry and is described, for example, in U.S. Pat. No. 5,198,203. MCM-50 has a lamellar structure.

MCM-41 can be made with different size pore openings in the mesoporous range. Preferably, an MCM-41 catalyst can have an average pore size of 40 angstroms or less, such as 25 angstroms or less. The content of framework molecules in an MCM-41 catalyst can also vary. The framework of the MCM-41 can include silica, in combination with alumina, titania, or zirconia. The ratio of silica to alumina, titania, or zirconia in the framework can vary from as high as 800:1 to as little as 25:1.

If binders are desired to be used, suitable binders for the M41S family, and specifically for MCM-41, can include alumina, silica, titania, silica-aluminas, or a combination thereof. With some types of binders, relatively high specific surface areas are possible with MCM-41 type catalysts, such as catalyst surface areas of at least 600 m$^2$/g, or at least 750 m$^2$/g, or at least 850 m$^2$/g, or at least 950 m$^2$/g. Preferably, binders providing a lower surface area can be selected, such as binders that provide a catalyst surface area of 650 m$^2$/g or less, or 550 m$^2$/g or less. Low surface area alumina or titania binders are options for producing a MCM-41 type catalyst with a reduced surface area.

One example of a suitable aromatic saturation catalyst is an alumina-bound mesoporous MCM-41 with a supported hydrogenation metal thereon/therein, e.g., Pt, Pd, another Group VIII metal, a Group VIB metal, or a mixture thereof. Individual hydrogenation metal embodiments can include, but are not limited to, Pt only or Pd only, while mixed hydrogenation metal embodiments can include, but are not limited to, combinations of Pt and Pd. When present, the amount of Group VIII hydrogenation metal(s) can be at least 0.1 wt % based on the total weight of the catalyst, for example at least 0.5 wt % or at least 0.6 wt %. Additionally or alternately, the amount of Group VIII hydrogenation metal(s) can be 5.0 wt % or less based on the total weight of the catalyst, for example 3.5 wt % or less, or 2.5 wt % or less, or 1.5 wt % or less, or 1.0 wt % or less, or 0.9 wt % or less, or 0.75 wt % or less, or 0.6 wt % or less. Further additionally or alternately, the total amount of hydrogenation metal(s) can be at least 0.1 wt % based on the total weight of the catalyst, for example at least 0.25 wt %, or at least 0.5 wt %, or at least 0.6 wt %, or at least 0.75 wt %, or at least 1 wt %. Still further additionally or alternately, the total amount of hydrogenation metal(s) can be 35 wt % or less based on the total weight of the catalyst, for example 30 wt % or less, or 25 wt % or less, or 20 wt % or less, or 15 wt % or less, or 10 wt % or less, or 5 wt % or less.

In some aspects, an aromatic saturation process can optionally include multiple beds and/or stages of hydrofinishing catalyst. The multiple beds or stages can be organized in a single reactor or in a plurality of reactors.

During high pressure hydrofinishing, a lubricant boiling range fraction can be exposed to a hydrofinishing catalyst under hydrofinishing conditions that include a hydrogen partial pressure of greater than 2000 psig (~13.8 MPa), or greater than 2500 psig (~17.2 MPa), or greater than 2600 psig (~18.0 MPa), or greater than 3000 psig (~20.6 MPa), or at least 3200 psig (~22.1 MPa), or at least 3400 psig (~23.4 MPa), or at least 3500 psig (24.1 MPa) such as up to 5000 psig (34.5 MPa) or more. This can correspond to a total pressure for the hydrofinishing conditions of greater than 2000 psig (~13.8 MPa), or greater than 2500 psig (~17.2 MPa), or greater than 2600 psig (~18.0 MPa), or greater than 3000 psig (~20.6 MPa), or at least 3200 psig (~22.1 MPa), or at least 3400 psig (~23.4 MPa), or at least 3500 psig (24.1 MPa) such as up to 5000 psig (34.5 MPa) or more. More generally, the hydrogen partial pressure and/or the total pressure during hydrofinishing under hydrofinishing conditions can be from 500 psig (~3.5 MPa) to about 5000 psig (~24.1 MPa), or at least 1000 psig (~6.9 MPa), or at least 1500 psig (~10.3 MPa).

Additionally or alternately, the total pressure and/or hydrogen partial pressure during hydrofinishing can be greater than, or possibly substantially higher than, the pressure in a catalytic dewaxing stage and/or other hydroprocessing stages used to form the hydroprocessed effluent. In some aspects, the total pressure and/or hydrogen partial pressure during high pressure hydrofinishing can be at least 250 psi (~1.7 MPa) greater than the hydrogen partial pressure of a catalytic dewaxing stage and/or any hydroprocessing stage of the hydroprocessing that was performed to form the hydroprocessed effluent, or at least 500 psi (~3.5 MPa) greater, or at least 800 psi (~5.5 MPa) greater, or at least 1000 psi (~6.9 MPa) greater, or at least 1200 psi (~8.3 MPa) greater, or at least 1500 psi (~10.3 MPa) greater, or at least 2000 psi (~13.8 MPa) greater.

The hydrofinishing conditions can also include a temperature of 200° C. to 350° C., or 220° C. to 320° C. Process conditions other than temperature and pressure can include a liquid hourly space velocity of from 0.2 hr$^{-1}$ to 10 hr$^{-1}$, or 0.5 hr$^{-1}$ to 5.0 hr$^{-1}$, and a hydrogen treat gas rate of from 35.6 m$^3$/m$^3$ to 1781 m$^3$/m$^3$ (200 scf/B to 10,000 scf/B), or 178 m$^3$/m$^3$ to 890.6 m$^3$/m$^3$ (1000 scf/B to 5000 scf/B).

After hydrofinishing, the aromatics content of the hydrofinished lubricant boiling range product can be 1.5 wt % or less, or 1.0 wt % or less, or 0.5 wt % or less, or 0.4 wt % or less, or 0.3 wt % or less, or 0.2 wt % or less, or 0.1 wt % or less. Additionally or alternately, the 3-ring aromatics content of the hydrofinished lubricant boiling range product can be 0.050 wt % or less, or 0.040 wt % or less, or 0.035 wt % or less, or 0.030 wt % or less, or 0.025 wt % or less, or 0.020 wt % or less, or 0.015 wt % or less, or 0.010 wt % or less. Optionally, at least a second lubricant boiling range product that was not exposed to high pressure hydrofinishing can have an aromatics content of at least 2.0 wt %, or at least 3.0 wt %, or at least 4.0 wt %. Such an optional second product can further optionally have a 3-ring aromatics content of at least 0.1 wt %, or at least 0.2 wt %. Optionally, the second lubricant boiling range product can be a hydrofinished lubricant boiling range product from a hydrofinishing process operated at a pressure of 2000 psig (~13.8 MPa) or less.

Hydroprocessing for Lubricant Base Oil Production

Examples of suitable processes for forming a hydroprocessed effluent can be lubricant base oil production processes and/or a fuels hydrocracking processes. In these types of processes, a feed that has at least a portion boiling in the lubricant boiling range (or higher), is hydrocracked to perform at least some conversion on the higher boiling range portion of the feed. This can result in improvements in the viscosity index and other properties of the higher boiling portions of the feed. Lubricant base oils can then be formed from the higher boiling portions, usually after performing additional processing steps such as dewaxing, hydrofinishing, aromatic saturation, and/or fractionation. A typical lubricant base oil production process may also include a preliminary hydrotreating stage. When either hydrotreating or hydrocracking is used for substantial sulfur removal, a gas-liquid separator may be used to remove gas phase contaminants from the liquid effluent at one or more locations within the process flow.

Hydrotreatment is typically used to reduce the sulfur, nitrogen, and aromatic content of a feed. Hydrotreating conditions can include temperatures of 200° C. to 450° C., or 315° C. to 425° C.; pressures of 250 psig (1.8 MPa) to 5000 psig (34.6 MPa) or 300 psig (2.1 MPa) to 3000 psig (20.8 MPa); Liquid Hourly Space Velocities (LHSV) of 0.2-10 h$^{-1}$; and hydrogen treat rates of 200 scf/B (35.6 m$^3$/m$^3$) to 10,000 scf/B (1781 m$^3$/m$^3$), or 500 (89 m$^3$/m$^3$) to 10,000 scf/B (1781 m$^3$/m$^3$). Although hydrotreatment is often performed for sulfur and/or nitrogen removal, in some aspects, hydrotreatment can be performed under what could be considered as "sweet" conditions, or alternatively "non-sour" conditions, where the sulfur content of the feed entering the hydrotreatment stage can be 500 wppm or less, or 200 wppm or less. Hydrotreatment in a non-sour and/or sweet stage can still be effective for reducing the amount of sulfur, nitrogen, and/or aromatics in a feed. The hydrotreating conditions noted above can be effective for hydrotreatment under sweet conditions or non-sour conditions, although the conditions may tend to have lower severity than hydrotreatment conditions for a comparable boiling range feed with a higher sulfur content.

Hydrotreating catalysts are typically those containing Group VIB metals, such as molybdenum and/or tungsten, and non-noble Group VIII metals, such as, iron, cobalt and nickel and mixtures thereof. These metals or mixtures of metals are typically present as oxides or sulfides on refractory metal oxide supports. Suitable metal oxide supports include low acidic oxides such as silica, alumina or titania. Preferred aluminas are porous aluminas such as gamma or eta having average pore sizes from 50 to 200 Å, or 75 to 150 Å; a surface area from 100 to 300 $m^2/g$, or 150 to 250 $m^2/g$; and a pore volume of from 0.25 to 1.0 $cm^3/g$, or 0.35 to 0.8 $cm^3/g$. The supports are preferably not promoted with a halogen such as fluorine as this generally increases the acidity of the support. Preferred metal catalysts include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina. Alternatively, the hydrotreating catalyst can be a bulk metal catalyst, or a combination of stacked beds of supported and bulk metal catalyst.

Hydrocracking catalysts typically contain sulfided base metals on acidic supports, such as amorphous silica alumina, cracking zeolites such as USY, or acidified alumina. Often these acidic supports are mixed or bound with other metal oxides such as alumina, titania or silica. Non-limiting examples of metals for hydrocracking catalysts include nickel, nickel-cobalt-molybdenum, cobalt-molybdenum, nickel-tungsten, nickel-molybdenum, and/or nickel-molybdenum-tungsten. Additionally or alternately, hydrocracking catalysts with noble metals can also be used. Non-limiting examples of noble metal catalysts include those based on platinum and/or palladium. Support materials which may be used for both the noble and non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common (and preferred, in one embodiment).

In aspects where a hydrocracking catalyst includes Group VIII noble metals, such as for hydrocracking in a "sweet" hydrocracking stage, the one or more Group VIII metals can be present in an amount ranging from 0.1 wt % to 5.0 wt %, or 0.1 wt % to 2.0 wt %, or 0.3 wt % to 2.0 wt %, or 0.1 wt % to 1.5 wt %, or 0.3 wt % to 1.5 wt %. In aspects where a hydrocracking catalyst includes base metals, the at least one Group VIII non-noble metal, in oxide form, can typically be present in an amount ranging from 2 wt % to 40 wt %, preferably from 4 wt % to 15 wt %. The at least one Group VIB metal, in oxide form, can typically be present in an amount ranging from 2 wt % to 70 wt %, preferably for supported catalysts from 6 wt % to 40 wt % or from 10 wt % to 30 wt %. These weight percents are based on the total weight of the catalyst. In some aspects, suitable hydrocracking catalysts can include nickel/molybdenum, nickel/tungsten, or nickel/molybdenum/tungsten as metals supported on the hydrocracking catalyst.

In some aspects, a hydrocracking catalyst can include a large pore molecular sieve that is selective for cracking of branched hydrocarbons and/or cyclic hydrocarbons. Zeolite Y, such as ultrastable zeolite Y (USY) is an example of a zeolite molecular sieve that is selective for cracking of branched hydrocarbons and cyclic hydrocarbons. Depending on the aspect, the silica to alumina ratio in a USY zeolite can be at least 10, such as at least 15, or at least 25, or at least 50, or at least 100. Depending on the aspect, the unit cell size for a USY zeolite can be 24.50 Angstroms or less, such as 24.45 Angstroms or less, or 24.40 Angstroms or less, or 24.35 Angstroms or less, such as 24.30 Angstroms (or less). In other aspects, a variety of other types of molecular sieves can be used in a hydrocracking catalyst, such as zeolite Beta and ZSM-5. Still other types of suitable molecular sieves can include molecular sieves having 10-member ring pore channels or 12-member ring pore channels. Examples of molecular sieves having 10-member ring pore channels or 12-member ring pore channels include molecular sieves having zeolite framework structures selected from MRE, MTT, EUO, AEL, AFO, SFF, STF, TON, OSI, ATO, GON, MTW, SFE, SSY, or VET.

In various aspects, the reaction conditions in the reaction system can be selected to generate a desired level of conversion of a feed. Conversion of the feed can be defined in terms of conversion of molecules that boil above a temperature threshold to molecules below that threshold. The conversion temperature can be any convenient temperature, such as 700° F. (371° C.). In an aspect, the amount of conversion in the stage(s) of the reaction system can be selected to enhance diesel production while achieving a substantial overall yield of fuels. The amount of conversion can correspond to the total conversion of molecules within any stage of a fuels hydrocracker, lubes hydrocracker, or other reaction system that is used to hydroprocess the lower boiling portion of the feed from the vacuum distillation unit. Suitable amounts of conversion of molecules boiling above 700° F. to molecules boiling below 700° F. include converting at least 5 wt % of the 700° F.+ portion of the feedstock to the stage(s) of the reaction system, or at least 15 wt %, or at least 25 wt %, or at least 35 wt %, or at least 45 wt %, or at least 55 wt %, or at least 65 wt %, or at least 75 wt %. It is noted that for a stage operating under sour conditions, the conversion of the 700° F.+ (371° C.) portion can be at least 15 wt %, or at least 25 wt %, or at least 35 wt %, or at least 45 wt %, or at least 55 wt %, or at least 65 wt %, or at least 75 wt %. Additionally or alternately, the amount of conversion for the reaction system can be 85% or less, or 80% or less, or 75% or less, or 70% or less. Still larger amounts of conversion may also produce a suitable hydrocracker bottoms for forming lubricant base oils, but such higher conversion amounts will also result in a reduced yield of lubricant base oils. Reducing the amount of conversion can increase the yield of lubricant base oils, but reducing the amount of conversion to below the ranges noted above may result in hydrocracker bottoms that are not suitable for formation of Group II, Group II+, or Group III lubricant base oils.

In order to achieve a desired level of conversion, a fuels hydrocracking reaction system, lubricant base oil production reaction system, or other reaction system can include at least one hydrocracking catalyst. Hydrocracking catalysts typically contain sulfided base metals on acidic supports, such as amorphous silica alumina, cracking zeolites such as USY, or acidified alumina. Often these acidic supports are mixed or bound with other metal oxides such as alumina, titania or silica. Examples of suitable acidic supports include acidic molecular sieves, such as zeolites or silicoaluminophosphates. One example of suitable zeolite is USY, such as a USY zeolite with cell size of 24.25 Angstroms or less. Additionally or alternately, the catalyst can be a low acidity molecular sieve, such as a USY zeolite with a Si to Al ratio of at least 20, and preferably at least 40 or 50. Zeolite Beta is another example of a potentially suitable hydrocracking catalyst. Non-limiting examples of metals for hydrocracking catalysts include metals or combinations of metals that include at least one Group VIII metal, such as nickel, nickel-cobalt-molybdenum, cobalt-molybdenum, nickel-tungsten, nickel-molybdenum, and/or nickel-molybdenum-tungsten. Additionally or alternately, hydrocracking catalysts with noble metals can also be used. Non-limiting examples of noble metal catalysts include those based on platinum and/or palladium. Support materials which may be used for both the noble and non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common (and preferred, in one embodiment).

In various embodiments, the conditions selected for hydrocracking for lubricant base oil production can depend on the desired level of conversion, the level of contaminants in the input feed to the hydrocracking stage, and potentially other factors. For a hydrocracking process performed under sour conditions, such as conditions where the sulfur content of the input feed to the hydrocracking stage is at least 500 wppm, can be carried out at temperatures of 550° F. (288° C.) to 840° F. (449° C.), hydrogen partial pressures of from 250 psig to 5000 psig (1.8 MPag to 34.6 MPag), liquid hourly space velocities of from 0.05 to 10 h$^{-1}$, and hydrogen treat gas rates of from 35.6 m$^3$/m$^3$ to 1781 m$^3$/m$^3$ (200 SCF/B to 10,000 SCF/B). In other embodiments, the conditions can include temperatures in the range of 600° F. (343° C.) to 815° F. (435° C.), hydrogen partial pressures of from 500 psig to 3000 psig (3.5 MPag-20.9 MPag), liquid hourly space velocities of from 0.2 h$^{-1}$ to 2 h$^{-1}$ and hydrogen treat gas rates of from 213 m$^3$/m$^3$ to 1068 m$^3$/m$^3$ (1200 SCF/B to 6000 SCF/B).

In other aspects, the conditions selected for hydrocracking for fuels hydrocracking and/or lubricant base oil production can depend on the desired level of conversion, the level of contaminants in the input feed to the hydrocracking stage, and potentially other factors. For example, hydrocracking conditions in the first stage and/or the second stage can be selected to achieve a desired level of conversion in the reaction system. A hydrocracking process in the first stage (or otherwise under sour conditions) can be carried out at temperatures of 550° F. (288° C.) to 840° F. (449° C.), hydrogen partial pressures of from 250 psig to 5000 psig (1.8 MPag to 34.6 MPag), liquid hourly space velocities of from 0.05 to 10 and hydrogen treat gas rates of from 35.6 m$^3$/m$^3$ to 1781 m$^3$/m$^3$ (200 SCF/B to 10,000 SCF/B). In other embodiments, the conditions can include temperatures in the range of 600° F. (343° C.) to 815° F. (435° C.), hydrogen partial pressures of from 500 psig to 3000 psig (3.5 MPag-20.9 MPag), and hydrogen treat gas rates of from 213 m$^3$/m$^3$ to 1068 m$^3$/m$^3$ (1200 SCF/B to 6000 SCF/B). The LHSV relative to only the hydrocracking catalyst can be from 0.25 h$^{-1}$ to 50 such as from 0.5 h$^{-1}$ to 20 and preferably from 1.0 h$^{-1}$ to 4.0 h$^{-1}$.

In some aspects, a portion of the hydrocracking catalyst can be contained in a second reactor stage. In such aspects, a first reaction stage of the hydroprocessing reaction system can include one or more hydrotreating and/or hydrocracking catalysts. The conditions in the first reaction stage can be suitable for reducing the sulfur and/or nitrogen content of the feedstock. A separator can then be used in between the first and second stages of the reaction system to remove gas phase sulfur and nitrogen contaminants. One option for the separator is to simply perform a gas-liquid separation to remove contaminant. Another option is to use a separator such as a flash separator that can perform a separation at a higher temperature. Such a high temperature separator can be used, for example, to separate the feed into a portion boiling below a temperature cut point, such as 350° F. (177° C.) or 400° F. (204° C.), and a portion boiling above the temperature cut point. In this type of separation, the naphtha boiling range portion of the effluent from the first reaction stage can also be removed, thus reducing the volume of effluent that is processed in the second or other subsequent stages. Of course, any low boiling contaminants in the effluent from the first stage would also be separated into the portion boiling below the temperature cut point. If sufficient contaminant removal is performed in the first stage, the second stage can be operated as a "sweet" or low contaminant stage.

Still another option can be to use a separator between the first and second stages of the hydroprocessing reaction system that can also perform at least a partial fractionation of the effluent from the first stage. In this type of aspect, the effluent from the first hydroprocessing stage can be separated into at least a portion boiling below the distillate (such as diesel) fuel range, a portion boiling in the distillate fuel range, and a portion boiling above the distillate fuel range. The distillate fuel range can be defined based on a conventional diesel boiling range, such as having a lower end cut point temperature of at least 350° F. (177° C.) or at least 400° F. (204° C.) to having an upper end cut point temperature of 700° F. (371° C.) or less or 650° F. (343° C.) or less. Optionally, the distillate fuel range can be extended to include additional kerosene, such as by selecting a lower end cut point temperature of at least 300° F. (149° C.).

In aspects where the inter-stage separator is also used to produce a distillate fuel fraction, the portion boiling below the distillate fuel fraction includes, naphtha boiling range molecules, light ends, and contaminants such as H$_2$S. These different products can be separated from each other in any convenient manner. Similarly, one or more distillate fuel fractions can be formed, if desired, from the distillate boiling range fraction. The portion boiling above the distillate fuel range represents the potential lubricant base oils. In such aspects, the portion boiling above the distillate fuel range is subjected to further hydroprocessing in a second hydroprocessing stage.

A hydrocracking process performed under non-sour conditions can be performed under conditions similar to those used for sour conditions, or the conditions can be different. Alternatively, a non-sour hydrocracking stage can have less severe conditions than a similar hydrocracking stage operating under sour conditions. Suitable hydrocracking conditions can include temperatures of 450° F. (232° C.) to 840° F. (449° C.), or 450° F. (232° C.) to 800° F. (427° C.), or 450° F. (249° C.) to 750° F. (399° C.), or 500° F. (260° C.) to 840° F. (449° C.), or 500° F. (260° C.) to 800° F. (427° C.), or 500° F. (260° C.) to 750° F. (399° C.); hydrogen partial pressures of from 250 psig to 5000 psig (1.8 MPag to 34.6 MPag); liquid hourly space velocities of from 0.05 h$^{-1}$ to 10 h$^{-1}$; and hydrogen treat gas rates of from 35.6 m$^3$/m$^3$ to 1781 m$^3$/m$^3$ (200 SCF/B to 10,000 SCF/B). In other embodiments, the conditions can include temperatures in the range of 500° F. (260° C.) to 815° F. (435° C.), or 500° F. (260° C.) to 750° F. (399° C.), or 500° F. (260° C.) to 700° C. (371° C.); hydrogen partial pressures of from 500 psig to 3000 psig (3.5 MPag-20.9 MPag); liquid hourly space velocities of from 0.2 h$^{-1}$ to 5 h$^{-1}$; and hydrogen treat gas rates of from 213 m$^3$/m$^3$ to 1068 m$^3$/m$^3$ (1200 SCF/B to 6000 SCF/B).

In some aspects, multiple hydrocracking stages may be present, with a first hydrocracking stage operating under sour conditions, while a second hydrocracking stage operates under non-sour conditions and/or under conditions where the sulfur level is substantially reduced relative to the first hydrocracking stage. In such embodiments, the temperature in the second stage hydrocracking process can be 40° F. (22° C.) less than the temperature for a hydrocracking process in the first stage, or 80° F. (44° C.) less, or 120° F. (66° C.) less. The pressure for the second stage hydrocracking process can be 100 psig (690 kPa) less than a hydrocracking process in the first stage, or 200 psig (1380 kPa) less, or 300 psig (2070 kPa) less.

In still another embodiment, the same conditions can be used for hydrotreating and hydrocracking beds or stages, such as using hydrotreating conditions for both or using hydrocracking conditions for both. In yet another embodiment, the pressure for the hydrotreating and hydrocracking beds or stages can be the same.

In some embodiments, a dewaxing catalyst is also included as part of the process train that generates the input feed. Typically, the dewaxing catalyst is located in a bed downstream from any hydrocracking catalyst stages and/or any hydrocracking catalyst present in a stage. This can allow the dewaxing to occur on molecules that have already been hydrotreated or hydrocracked to remove a significant fraction of organic sulfur- and nitrogen-containing species. The dewaxing catalyst can be located in the same reactor as at least a portion of the hydrocracking catalyst in a stage. Alternatively, the effluent from a reactor containing hydrocracking catalyst, possibly after a gas-liquid separation, can be fed into a separate stage or reactor containing the dewaxing catalyst.

Suitable dewaxing catalysts can include molecular sieves such as crystalline aluminosilicates (zeolites). In an embodiment, the molecular sieve can comprise, consist essentially of, or be ZSM-5, ZSM-22, ZSM-23, ZSM-35, ZSM-48, zeolite Beta, or a combination thereof, for example ZSM-23 and/or ZSM-48, or ZSM-48 and/or zeolite Beta. Optionally but preferably, molecular sieves that are selective for dewaxing by isomerization as opposed to cracking can be used, such as ZSM-48, zeolite Beta, ZSM-23, or a combination thereof. Additionally or alternately, the molecular sieve can comprise, consist essentially of, or be a 10-member ring 1-D molecular sieve. Examples include EU-1, ZSM-35 (or ferrierite), ZSM-11, ZSM-57, NU-87, SAPO-11, ZSM-48, ZSM-23, and ZSM-22. Preferred materials are EU-2, EU-11, ZBM-30, ZSM-48, or ZSM-23. ZSM-48 is most preferred. Note that a zeolite having the ZSM-23 structure with a silica to alumina ratio of from 20:1 to 40:1 can sometimes be referred to as SSZ-32. Other molecular sieves that are isostructural with the above materials include Theta-1, NU-10, EU-13, KZ-1, and NU-23. Optionally but preferably, the dewaxing catalyst can include a binder for the molecular sieve, such as alumina, titania, silica, silica-alumina, zirconia, or a combination thereof, for example alumina and/or titania or silica and/or zirconia and/or titania.

Preferably, the dewaxing catalysts used in processes according to the disclosure are catalysts with a low ratio of silica to alumina. For example, for ZSM-48, the ratio of silica to alumina in the zeolite can be less than 200:1, or less than 110:1, or less than 100:1, or less than 90:1, or less than 80:1. In various embodiments, the ratio of silica to alumina can be from 30:1 to 200:1, or 60:1 to 110:1, or 70:1 to 100:1.

In various embodiments, the catalysts according to the disclosure can further include a metal hydrogenation component. The metal hydrogenation component is typically a Group VI and/or a Group VIII metal. Preferably, the metal hydrogenation component is a Group VIII noble metal. Preferably, the metal hydrogenation component is Pt, Pd, or a mixture thereof. In an alternative preferred embodiment, the metal hydrogenation component can be a combination of a non-noble Group VIII metal with a Group VI metal. Suitable combinations can include Ni, Co, or Fe with Mo or W, preferably Ni with Mo or W.

The metal hydrogenation component may be added to the catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

The amount of metal in the catalyst can be at least 0.1 wt % based on catalyst, or at least 0.15 wt %, or at least 0.2 wt %, or at least 0.25 wt %, or at least 0.3 wt %, or at least 0.5 wt % based on catalyst. The amount of metal in the catalyst can be 20 wt % or less based on catalyst, or 10 wt % or less, or 5 wt % or less, or 2.5 wt % or less, or 1 wt % or less. For embodiments where the metal is Pt, Pd, another Group VIII noble metal, or a combination thereof, the amount of metal can be from 0.1 to 5 wt %, preferably from 0.1 to 2 wt %, or 0.25 to 1.8 wt %, or 0.4 to 1.5 wt %. For embodiments where the metal is a combination of a non-noble Group VIII metal with a Group VI metal, the combined amount of metal can be from 0.5 wt % to 20 wt %, or 1 wt % to 15 wt %, or 2.5 wt % to 10 wt %.

The dewaxing catalysts useful in processes according to the disclosure can also include a binder. In some optional embodiments, the dewaxing catalysts used in process according to the disclosure can be formulated using a low surface area binder, a low surface area binder represents a binder with a surface area of 100 m$^2$/g or less, or 80 m$^2$/g or less, or 70 m$^2$/g or less.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture. The amount of framework alumina in the catalyst may range from 0.1 to 3.33 wt %, or 0.1 to 2.7 wt %, or 0.2 to 2 wt %, or 0.3 to 1 wt %.

Process conditions in a catalytic dewaxing zone can include a temperature of from 200 to 450° C., preferably 270 to 400° C., a hydrogen partial pressure of from 1.8 to 34.6 MPag (250 to 5000 psi), preferably 4.8 to 20.8 MPag, a liquid hourly space velocity of from 0.2 to 10 v/v/hr, preferably 0.5 to 3.0, and a hydrogen circulation rate of from 35.6 to 1781 m$^3$/m$^3$ (200 to 10,000 scf/B), preferably 178 to 890.6 m$^3$/m$^3$ (1000 to 5000 scf/B). In still other aspects, the conditions can include temperatures in the range of 600° F. (343° C.) to 815° F. (435° C.), hydrogen partial pressures of from 500 psig to 3000 psig (3.5 MPag-20.9 MPag), and hydrogen treat gas rates of from 213 m$^3$/m$^3$ to 1068 m$^3$/m$^3$ (1200 SCF/B to 6000 SCF/B).

In yet other aspects where the hydrogen partial pressure during catalytic dewaxing is lower than the hydrogen partial pressure during hydrofinishing, the hydrogen partial pressure during catalytic dewaxing can be 10.3 MPag or less, or 8.0 MPag or less, or 6.9 MPag or less, or 5.0 MPag or less, or 3.5 MPag or less, or 2.8 MPag or less, and optionally as low as about 1.8 MPag or lower.

Example of Reaction System Configuration

FIG. 1 shows an example of a reaction system configuration suitable for performing high pressure hydrofinishing as described herein. In FIG. 1, a hydroprocessed effluent 115 is formed by hydroprocessing a feed 105. At least a portion of feed 105 can correspond to a lubricant boiling range (or higher) feed. Hydrogen treat gas 102 can be added to feed 105 and/or added to hydroprocessing reactor(s) 110 in order to facilitate the hydroprocessing reactions that form hydroprocessed effluent 115. The hydroprocessing reactions in reactor(s) 110 can include any convenient type of hydroprocessing, including hydrotreatment, hydrocracking, catalytic dewaxing, and/or hydrofinishing. It is noted that if hydrofinishing is performed in hydroprocessing reactor(s) 110, the hydrofinishing is performed under conditions corresponding to another type of hydroprocessing (i.e., hydrotreatment, hydrocracking, or dewaxing conditions), and/or the hydrofinishing can be performed at a hydrogen partial pressure of 2000 psia (~13.8 MPa) or less.

After forming hydroprocessed effluent 115, the hydroprocessed effluent can be fractionated in separator 120 to form one or more lubricant boiling range effluent fractions. In the example shown in FIG. 1, a first fraction 126 and a second fraction 128 are formed. Fraction 126 corresponds to a higher viscosity fraction while fraction 128 corresponds to a lower viscosity fraction. One or both of fractions 126 and 128 can then be hydrofinished under high pressure hydrofinishing conditions in hydrofinishing reactors 136 and 138, respectively. A separate hydrogen sour 142 can be used to provide hydrogen at a desired pressure for hydrofinishing in reactors 136 and/or 138. It is noted that if high pressure hydrofinishing is not desired for one of fractions 126 and 128, the corresponding reactor 136 or 138 can be bypassed. The effluents from reactors 136 and 138 correspond to higher viscosity base stock 146 and lower viscosity base stock 148, respectively.

Example of Hydrofinishing at Increasing Hydrogen Partial Pressures

Figure 2:
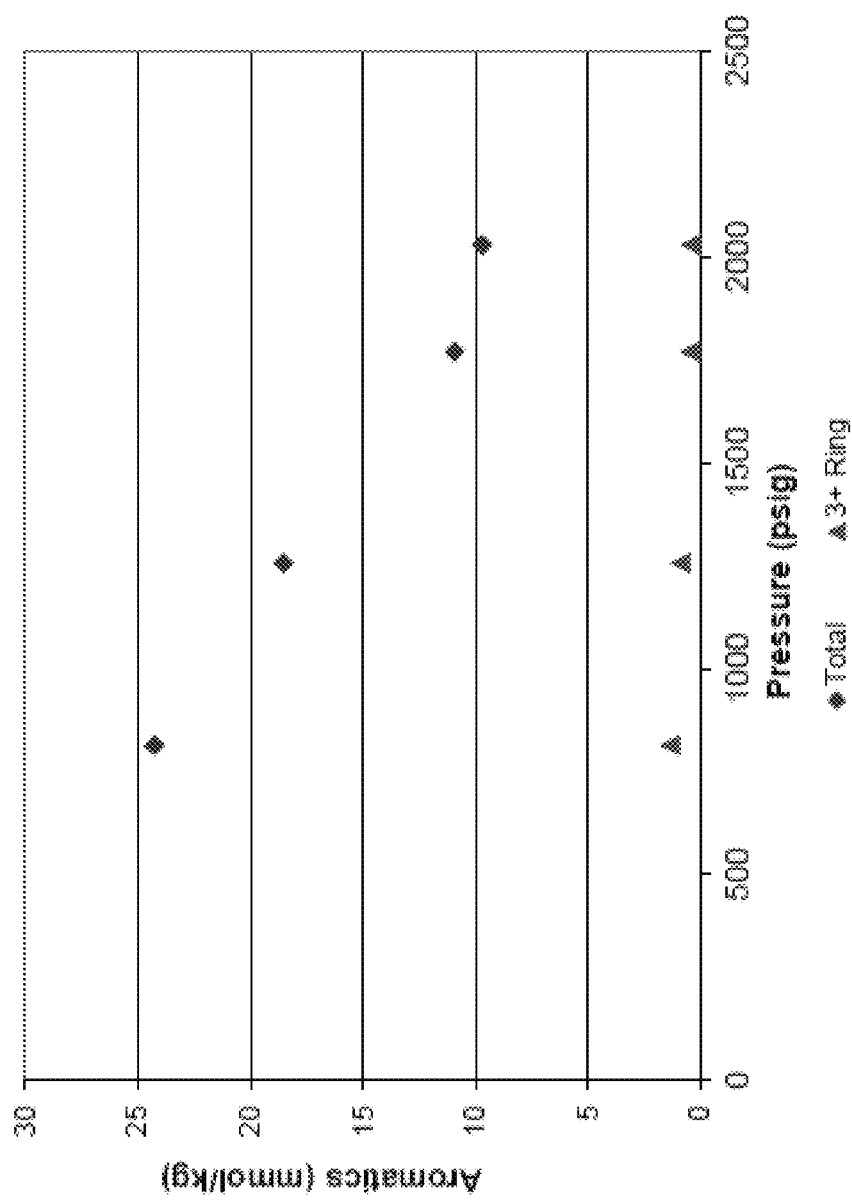
FIG. 2 shows total aromatics content and 3-ring aromatics content for a hydroprocessed and hydrofinished effluent at various hydrofinishing pressures.

FIG. 2 shows an example of hydrofinishing of a feed at increasing amounts of hydrogen partial pressure, ranging from ~800 psig to 2000 psig. FIG. 2 shows the resulting amounts of total aromatics and 3-ring aromatics after hydrofinishing. The aromatics content of the feed and the product are also shown in Table 1, along with the molecular weight estimate used for determining the aromatics content of the feed.

TABLE 1

Aromatics of Hydrofinsihing Feed and Hydrofinished Product

| | | Feed | | | | |
|---|---|---|---|---|---|---|
| Pressure | psig | N/A | 2030 | 1770 | 1257 | 815 |
| Total Aromatics | Wt % | 2.59 | 0.47 | 0.53 | 0.90 | 1.17 |
| 3-ring Aromatics | Wt % | 0.41 | 0.039 | 0.044 | 0.084 | 0.13 |
| Mol. Wt. Est. | g/mole | 484 | | | | |

The hydrofinishing was performed by exposing a hydroprocessed lubricant boiling range feed to a MCM-41 catalyst with about 1 wt % supported Pd and Pt at a temperature of ~250° C. and a space velocity of ~2 hr$^{-1}$. As shown in FIG. 2 and Table 1, increasing the hydrogen partial pressure from ~800 psig to 2000 psig resulted in substantial decreases in the aromatics content of the hydrofinished product. Although the amount of 3-ring aromatics remaining at ~800 psig or ~1200 psig is low, increasing the hydrogen partial pressure still appears to provide some additional reduction in the 3-ring aromatics content of the hydrofinished product. This suggests that further increases in hydrogen partial pressure can be used to achieve still lower total aromatics and/or 3-ring aromatics content for a hydrofinished product.

ADDITIONAL EMBODIMENTS

Embodiment 1

A method for forming a lubricant base stock, comprising: hydrocracking a lubricant boiling range feed under hydrocracking conditions; dewaxing the at least a portion of a lubricant boiling range feed under dewaxing conditions to form a hydroprocessed effluent, the dewaxing occurring prior to the hydrocracking, during the hydrocracking, after the hydrocracking, or a combination thereof fractionating the hydroprocessed effluent to form one or more hydroprocessed lubricant boiling range fractions; and hydrofinishing at least one hydroprocessed lubricant boiling range fraction under hydrofinishing conditions to form at least one hydrofinished product, the hydrofinishing conditions including at least one of a) a hydrogen partial pressure that is at least 250 psi (1.7 MPa) greater than a hydrogen partial pressure of the dewaxing conditions, and b) a hydrogen partial pressure of greater than 2000 psig (13.8 MPa), the hydrogen partial pressure of the hydrofinishing conditions being greater than the hydrogen partial pressure of the dewaxing conditions.

Embodiment 2

The method of Embodiment 1, wherein the hydrofinishing conditions include a hydrogen partial pressure of greater than 2000 psig (13.8 MPa), or greater than 2500 psig (17.2 MPa), or greater than 3000 psig (20.7 MPa), or at least 3200 psig (22.1 MPa), or at least 3500 psig (24.1 MPa).

Embodiment 3

The method of any of the above embodiments, wherein the hydrocracking conditions include a hydrogen partial pressure of 2000 psig (13.8 MPa) or less, or 1500 psig (10.3 MPa) or less; wherein the dewaxing conditions include a hydrogen partial pressure of 2000 psig (13.8 MPa) or less, or 1500 psig (10.3 MPa) or less; or a combination thereof.

Embodiment 4

The method of any of the above embodiments, wherein the dewaxing conditions include a hydrogen partial pressure of 10.3 MPag or less, or 8.0 MPag or less, or 6.9 MPag or less, or 5.0 MPag or less, or 3.5 MPag or less, or 2.8 MPag or less.

Embodiment 5

The method of any of the above embodiments, further comprising hydrotreating the at least a portion of the lubricant boiling range feed prior to hydrocracking.

Embodiment 6

The method of any of the above embodiments, wherein hydrofinishing at least one hydroprocessed lubricant boiling range fraction comprises hydrofinishing a plurality of hydroprocessed lubricant boiling range fractions.

Embodiment 7

The method of any of the above embodiments, wherein the at least one hydrofinished product has an aromatics content of 1.5 wt % or less, or 1.0 wt % or less, or 0.5 wt % or less, or 0.4 wt % or less, or 0.3 wt % or less, or 0.2 wt % or less, or 0.1 wt % or less; or wherein the at least one hydrofinished product has a 3-ring aromatics content of 0.035 wt % or less, or 0.030 wt % or less, or 0.025 wt % or less, or 0.020 wt % or less, or 0.015 wt % or less, or 0.010 wt % or less; or a combination thereof.

Embodiment 8

The method of any of the above embodiments, wherein at least a second hydroprocessed lubricant boiling range fraction is hydrofinished under second hydrofinishing conditions to form a second hydrofinished product, the second hydrofinishing conditions including a hydrogen partial pressure of 2000 psig (13.8 MPa) or less, or 1500 psig (10.3 MPa) or less.

Embodiment 9

The method of Embodiment 8, wherein the second hydrofinished product has a total aromatics content of at least 0.5 wt %, a 3-ring aromatics content of at least 0.040 wt %, or a combination thereof.

Embodiment 10

The method of any of the above embodiments, wherein the hydrogen partial pressure of the hydrofinishing conditions is greater than the hydrogen partial pressure of the hydrocracking conditions by at least 500 psi (3.5 MPa), or at least 800 psi (5.5 MPa), or at least 1000 psi (6.9 MPa), or at least 1500 psi (10.3 MPa); or wherein the hydrogen partial pressure of the hydrofinishing conditions is greater than the hydrogen partial pressure of the dewaxing conditions by at least 500 psi (3.5 MPa), or at least 800 psi (5.5 MPa), or at least 1000 psi (6.9 MPa), or at least 1500 psi (10.3 MPa); or a combination thereof.

Embodiment 11

The method of any of the above embodiments, wherein the at least one lubricant boiling range effluent fraction has a total aromatics content of 1.5 wt % to 10.0 wt %, or 2.0 wt % to 10.0 wt %, or 4.0 wt % to 10.0 wt %, or 1.5 wt % to 8.0 wt %, or 2.0 wt % to 8.0 wt %, or 4.0 wt % to 8.0 wt %; or wherein the at least one lubricant boiling range effluent fraction has a 3-ring aromatics content of 0.1 wt % to 2.0 wt %, or 0.1 wt % to 1.0 wt %, or 0.1 wt % to 0.5 wt %, or 0.2 wt % to 2.0 wt %, or 0.2 wt % to 1.0 wt %, or 0.2 wt % to 0.5 wt %, or 0.4 wt % to 2.0 wt %, or 0.4 wt % to 1.0 wt %; or a combination thereof.

Embodiment 12

A hydrofinished product made according to the method of any of Embodiments 1-11.

Embodiment 13

A hydrofinished lubricant boiling range composition having a kinematic viscosity at 100° C. of at least 2 cSt, a viscosity index of at least 80, a total aromatics content of 0.4 wt % or less, and a 3-ring aromatics content of 0.035 wt % or less.

Embodiment 14

The hydrofinished lubricant boiling range composition of Embodiment 13, wherein the total aromatics content is 0.3 wt % or less, or 0.2 wt % or less, or 0.1 wt % or less; or wherein the 3-ring aromatics content is 0.030 wt % or less, or 0.025 wt % or less, or 0.020 wt % or less, or 0.015 wt % or less, or 0.010 wt % or less; or a combination thereof.

Embodiment 15

The hydrofinished lubricant boiling range composition of Embodiment 13 or 14, the hydrofinished product of Embodiment 12, or the method of any of Embodiments 1-11, wherein the kinematic viscosity (of the hydrofinished product or hydrofinished lubricant boiling range composition) at 100° C. is 2 cSt to 4 cSt, or 4 cSt to 8 cSt, or 8 cSt to 16 cSt, or 16 cSt to 32 cSt; or wherein the viscosity index is at least 120; or a combination thereof.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. A hydrofinished lubricant boiling range composition comprising aromatics wherein at least a portion of the aromatics are 3-ring aromatics, the lubricant boiling range composition having a kinematic viscosity at 100° C. of at least 2 cSt, a total aromatics content of 0.3 wt. % to 1.5 wt. %, and a 3-ring aromatics content of 0.035 wt. % or less.

2. The hydrofinished lubricant boiling range composition of claim 1, wherein the 3-ring aromatics content is 0.030 wt. % or less.

3. The hydrofinished lubricant boiling range composition of claim 1, wherein the kinematic viscosity at 100° C. is 2 cSt to 4 cSt.

4. A hydrofinished lubricant boiling range composition comprising:
   3-ring aromatics; and
   wherein the hydrofinished lubricant boiling range composition is a Group I or Group II base stock having:
      a kinematic viscosity at 100° C. of at least 2 cSt;
      a viscosity index of at least 80 but less than 120;
      a total aromatics content of 0.3 wt. % to 1.5 wt. %; and
      a 3-ring aromatics content of 0.035 wt. % or less.

5. The hydrofinished lubricant boiling range composition of claim 4, wherein the lubricant boiling range composition is the Group I base stock.

6. The hydrofinished boiling range composition of claim 4, wherein the lubricant boiling range composition is the Group II base stock.

7. The hydrofinished lubricant boiling range composition of claim 4, wherein the 3-ring aromatics content is 0.030 wt. % or less.

8. The hydrofinished lubricant boiling range composition of claim 1, wherein the kinematic viscosity at 100° C. is 4 cSt to 8 cSt.

9. The hydrofinished lubricant boiling range composition of claim 1, wherein the kinematic viscosity at 100° C. is 8 cSt to 16 cSt.

10. The hydrofinished lubricant boiling range composition of claim 1, wherein the kinematic viscosity at 100° C. is 16 cSt to 32 cSt.

11. The hydrofinished lubricant boiling range composition of claim 1, wherein the lubricant boiling range composition is a Group III base stock.

12. The hydrofinished lubricant boiling range composition of claim 4, wherein the hydrofinished lubricant boiling range composition is not blended.

13. The hydrofinished lubricant boiling range composition of claim 1 wherein the hydrofinished lubricant boiling range composition has a kinematic viscosity at 100° C. in a range of 2 cSt to 6 cSt.

14. The hydrofinished lubricant boiling range composition of claim 1 wherein the lubricant boiling range composition has a kinematic viscosity at 100° C. of at least 2 cSt, a viscosity index of at least 120, a total aromatics content of 0.3 wt. % to 0.4 wt. %, and a 3-ring aromatics content of 0.035 wt. % or less.

15. The hydrofinished lubricant boiling range composition of claim 1 wherein the lubricant boiling range composition has a total aromatics content of 0.5 wt. % to 1.5 wt. %.

16. A hydrofinished lubricant boiling range composition comprising:
   aromatics wherein at least a portion of the aromatics are 3-ring aromatics, the hydrofinished lubricant boiling range composition having a kinematic viscosity at 100° C. of at least 2 cSt, a viscosity index of at least 80, a total aromatics content of 0.3 wt. % to 1.5 wt. %, and a 3-ring aromatics content of 0.035 wt. % or less,
   wherein a feedstock of the hydrofinished lubricant boiling range composition comprises at least one feedstock selected from the group consisting of whole reduced petroleum crudes, reduced petroleum crudes, cycle oils, vacuum gas oil, coker gas oils, light to heavy distillates comprising raw virgin distillates, hydrocrackates, hydrotreated oils, and combinations thereof.

* * * * *